UNITED STATES PATENT OFFICE.

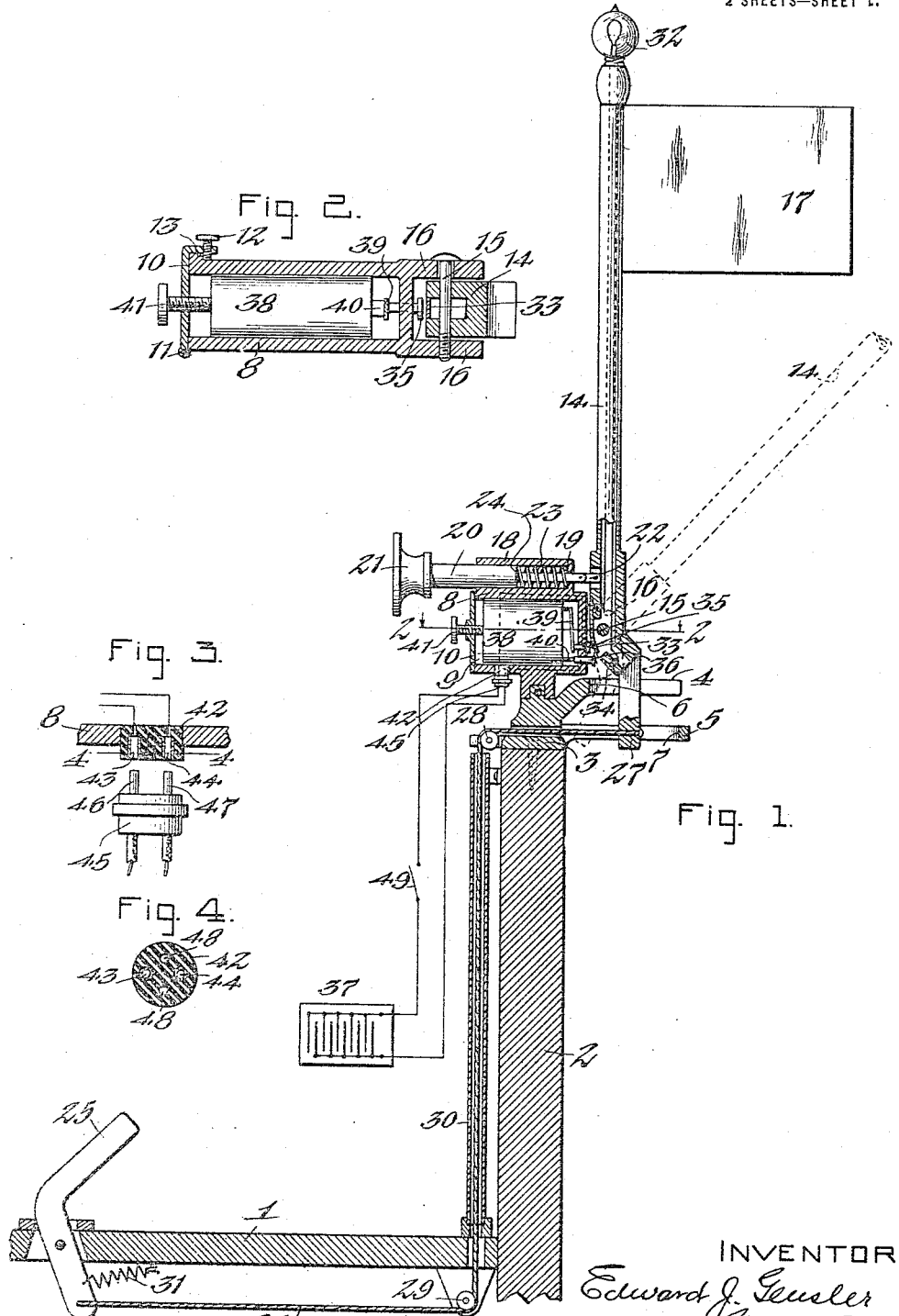

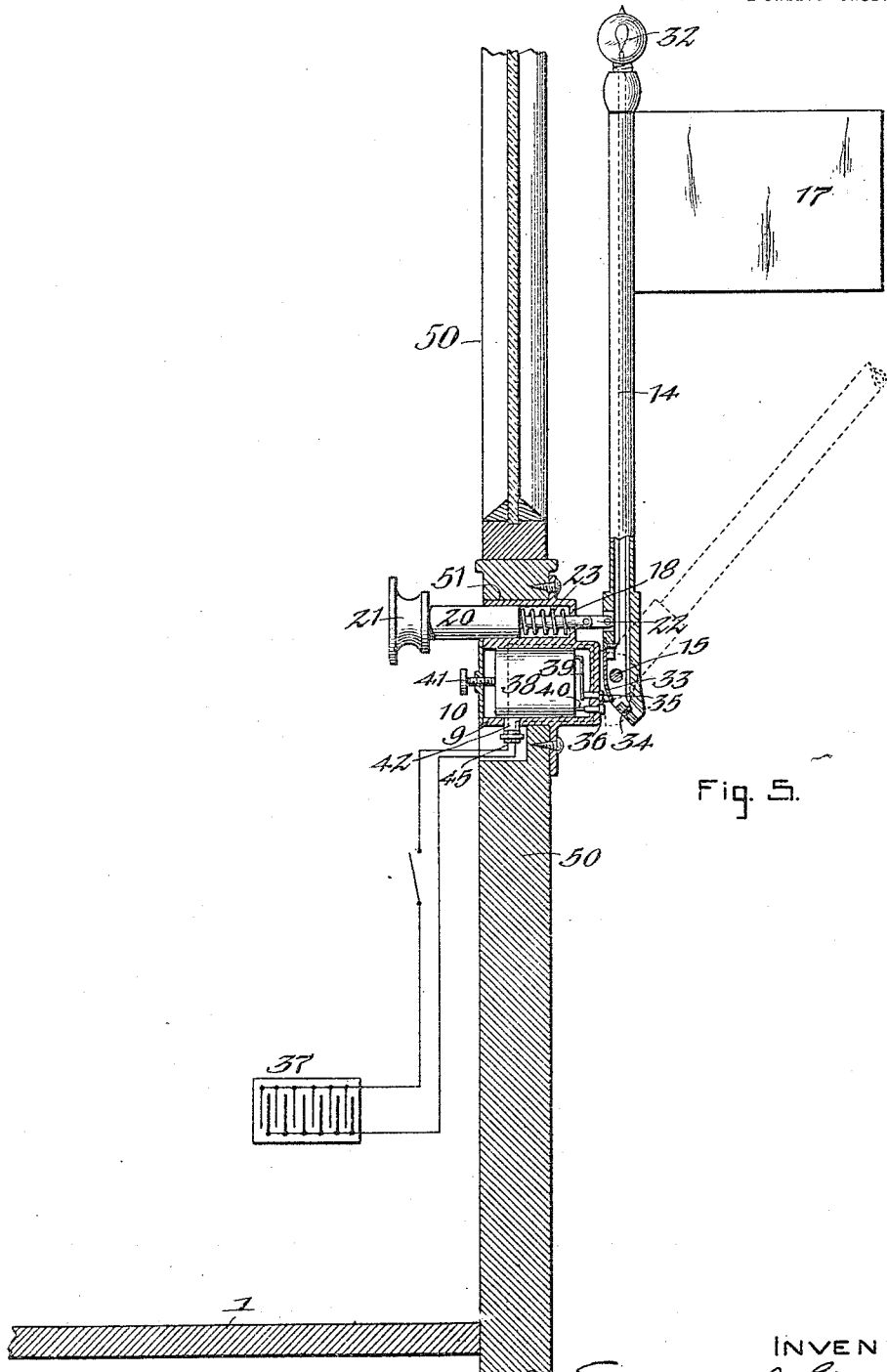

EDWARD J. GENSLER, OF BUFFALO, NEW YORK.

AUTOMOBILE-SIGNAL.

1,267,538.  Specification of Letters Patent.  Patented May 28, 1918.

Application filed June 7, 1916. Serial No. 102,206.

*To all whom it may concern:*

Be it known that I, EDWARD J. GENSLER, a citizen of the United States, residing at Buffalo, in the county of Erie and State of New York, have invented new and useful Improvements in Automobile-Signals, of which the following is a specification.

This invention relates to a traffic signal which is more particularly designed for use on automobiles in order to notify the drivers of other automobiles or persons on the roadway near by as to the intentions of the particular party who is giving the signal.

It is the purpose of this invention to provide a signal for this purpose which is simple and inexpensive in construction, which can be easily and reliably operated either by the foot, by the hand or by the shoulder of a person for giving a signal either during daytime or nighttime, and which is provided with an electric lighting system capable of being operated either by a storage battery or by means of a dry battery such as are now in common use.

In the accompanying drawings:

Figure 1 is a fragmentary vertical transverse section of an open automobile body equipped with one form of traffic signal embodying my invention. Fig. 2 is a horizontal section of the same, on an enlarged scale, taken on line 2—2, Fig. 1. Fig. 3 is a fragmentary sectional view, on an enlarged scale, of the electrical coupling whereby the storage battery may be connected with or disconnected from the circuit of the electric signal lamp forming part of the signal mechanism. Fig. 4 is a horizontal section taken on the correspondingly numbered line in Fig. 3. Fig. 5 is a fragmentary vertical transverse section of the body of a closed automobile showing the same equipped with a modified form of my improvement.

Similar characters of reference indicate corresponding parts in the several views.

Referring to Figs. 1–4, 1 represents the floor and 2 one of the side walls of an open automobile body. On the upper edge of this side wall is secured a bracket 3 which is provided with upper and lower laterally-projecting guide-arms 4, 5, which are provided with transverse guide slots 6, 7, respectively.

Mounted on top of the inner part of the bracket is a signal body or casing 8 which contains a compartment or chamber 9 the outer end of which is closed but the inner end of which is open and adapted to be closed by means of a lid or door 10 which is hinged at one edge to the signal body or casing, as shown at 11, so that the same may be swung either away from the inlet of the signal body or casing or toward this inlet for the purpose of closing said compartment. This lid may be held shut by any suitable means for instance by a screw 12 arranged on the free edge of the lid and engaging behind a shoulder 13 on the inner end of the exterior of the signal casing.

14 represents a vertically swinging signal arm which is pivoted at its lower end by means of a horizontal longitudinal bolt 15 on a pair of supporting lugs 16 which project laterally from the outer end of the signal casing, so that the signal arm may either assume an upright, normal or inoperative position, as shown by full lines in Fig. 1, and also swing laterally outward into an inclined, operative position, as shown by dotted lines in the same figure. At its upper end the signal arm is preferably provided with a flag 17, so that when this signal arm is thrown laterally outward the same will be more conspicuous during the daytime and more readily observed by the traffic officer, the drivers of other automobiles or pedestrians, so that the same may know the intention of the respective driver who is giving the signal. This outward movement of the signal arm into its operative or inclined position may be effected either by the hand, by the shoulder or by the foot of a person according to whichever of these members is free to operate the signal. The hand and shoulder operated mechanism which is shown for this purpose comprises a guideway 18 arranged on top of the signal casing and provided with an inwardly facing shoulder 19, a horizontal transversely movable shifting rod 20 sliding in said guideway and provided at its inner end with a handle 21, a link 22 connecting the outer end of the shifting rod with the signal arm, and a spring 23 arranged within the guideway and around part of the shifting rod sliding therein and bearing at one end against the shoulder 19 of the guideway while its opposite end bears against an outwardly facing shoulder 24 on the shifting rod. Normally the spring 23 holds the signal arm in the upright position indicated by full lines in Fig. 1 and by applying outward pressure on the handle 21 either by means of the hand or the shoulder of the driver the signal arm will be swung outwardly into the position shown by dotted lines in Fig. 1, thereby giving a signal to persons near by but as soon as the pressure on the handle is released the spring 23 again returns the signal arm to its elevated upright position.

Various means may be employed for shifting the signal arm by foot pressure into its operative position, those shown in the drawings comprising a foot lever 25 pivoted in any suitable manner on the floor of the car, and a cord 26 or other flexible member connected at one end with the lower arm of the foot lever and connected at its opposite end with a downward extension 27 arranged on the signal arm below its fulcrum, the intermediate part of this shifting cord passing around guide rollers 28, 29 mounted on the inner side of the bracket 3 and the underside of the floor and also through an upright guide tube 30 arranged adjacent to the inner side of the adjacent wall of the body. Upon depressing the upper arm of the foot lever the same will be turned in a direction which will cause the cord 26 to pull on the extension of the signal arm and move the latter from its upright position outwardly into an inclined laterally projecting position. Upon releasing the pressure of the foot against the foot lever the spring 23 of the hand operating mechanism will return the signal arm to its upright normal position. For the purpose of returning the foot lever to its inoperative position, it is preferable to employ a spring 31 which connects the lower arm of this foot lever with the underside of an automobile body, as shown in Fig. 1. The lower extension of the signal arm is arranged in the slots 6, 7, of the guide arms 4, 5, thereby holding the signal arm at all times reliably in its upright as well as in its laterally inclined position and preventing displacement of the same.

The parts described so far serve as means for giving a signal during the daytime but in order to also enable a signal to be given at nighttime, the following means are provided:

32 represents an electric lamp mounted on the free or upper end of the signal arm and 33, 34 represent two movable switch contacts mounted on the signal arm adjacent to its fulcrum and electrically connected with the two terminals of the lamp, the wires whereby this connection is made being extended through the signal arm which latter is preferably made hollow for this purpose. 35, 36 represent two fixed or stationary switch contacts which are mounted on the outer end wall of the signal casing and adapted to be engaged by the movable contacts 33, 34, when the signal arm is swung into its operative inclined position but to be out of engagement therefrom when the signal arm is in its upright inoperative position. The stationary contacts are adapted to be electrically connected with opposite terminals of an electric source, so that when the same are engaged by the movable contacts the electric lamp will be illuminated when the signal arm is swung laterally into an inclined position by reason of the circuit through the lamp being closed at this time, but when the signal arm is swung into an upright position the electric lamp will be extinguished by reason of the circuit through the same being broken as the movable contacts 33, 34 move out of engagement from the fixed contacts 35, 36.

As shown in the drawings, the electric current may be supplied to the lamp either by means of a storage battery 37 which is mounted on any suitable part of the body of the automobile or by means of a dry battery 38 which may be removably mounted in the compartment 9 of the signal casing. The dry battery may be of any suitable or standard construction and provided with two terminals 39, 40, so that upon moving the same into the compartment of the casing these terminals will engage respectively with the fixed contacts 35, 36, on the outer or closed end of the casing, as shown in Fig. 1, and serve as the means for lighting the lamp 32 when the circuit including the dry battery and the lamp is closed up swinging the signal arm downwardly into an inclined position. The dry battery is moved inwardly and held with its terminal contacts in engagement with the fixed contacts 35, 36, by a shifting device which preferably consists of a screw 41 engaging with a threaded opening in the lid 10 and bearing against the inner end of the dry battery. When it is not desired to use the dry battery for the purpose of illuminating the signal lamp 32 the shifting screw 41 may be backed away from the dry battery and the latter may be drawn outwardly sufficiently so that its terminals do not engage with the fixed contacts 35, 36.

If it is desired to use the storage battery for lighting the lamp 32 instead of the dry battery, this may be accomplished by means of an electrical coupling comprising a socket member 42 which is secured to the underside of the signal casing and provided with two socket contacts 43, 44 which are electrically connected respectively with the fixed contacts 35, 36, and a plug member 45 provided with two contact pins 46, 47 which are adapted to engage with the socket contacts 43, 44, and are electrically connected with opposite poles of the storage battery. By pushing the plug contacts into the socket contacts the storage battery is coupled with the fixed contacts 35, 36, so that the current of the storage battery will be placed in circuit with the lamp 32 and the latter will be illuminated when the signal arm swings into its laterally inclined operative position. When it is not desired to use the storage battery the plug contacts may be withdrawn from the socket contacts and turned one quarter and then engaged with a pair of idle or blind sockets 48, 48 on the socket piece in which case no electrical connection is made between the storage battery and the fixed contacts 35, 36, and the storage battery is cut out. By this means the plug of the storage battery coupling may always remain attached to the signal casing regardless of whether the storage battery is in circuit or out of circuit, thereby avoiding misplacing this plug which otherwise would be liable to occur. If desired, the storage battery may be cut into or out of circuit by means of a main switch 49 arranged in one of the lines leading from this battery, as shown in Fig. 1.

By providing means for connecting either a storage battery or a dry battery with the signal lamp the storage battery can be used mainly for lighting the signal lamp and the dry battery may be held in reserve and used only in case of emergency when the storage battery gives out. It also renders it possible to use this signal mechanism with a dry battery only in case the particular car on which this signal mechanism is mounted does not carry a storage battery.

The modified construction shown in Fig. 5 is more particularly designed for use in a motor car having a closed body such as a taxicab, in which the side wall 50 extends upwardly alongside of the signal arm. In this construction, the lower extension of the signal arm and the guide arms for the same are omitted as well as the foot operated means for shifting the signal arm, and the signal casing is mounted in an opening 51 in the automobile body instead of being mounted on a bracket. In other respects the construction shown in Fig. 5 is substantially the same as the construction shown in Fig. 1.

As a whole, this signal mechanism is very efficient in operation and permits of quickly and reliably warning other persons or drivers as to the intention of the party operating the signal. Furthermore, the construction of this signal is such that the same can be produced at comparatively low cost and is capable of being installed generally without alterations on most of the automobiles now on the market, thereby avoiding the expense of providing a large variety of patterns to meet the requirements of the market.

I claim as my invention:

1. An automobile signal, comprising a body having a compartment and electrical contacts, a signal arm pivoted on said body, an electric lamp mounted on said arm, electrical contacts mounted on said arm and forming the terminals of said lamp and adapted to engage with said contacts on said body, said compartment being adapted to receive a battery the terminals of which are adapted to engage with the terminals mounted on said body, a movable lid applied to said body for opening and closing the compartment thereof, means for holding said lid in its closed position, and a pressing device mounted on said lid and adapted to hold said battery with its terminals in engagement with the terminals of said body.

2. An automobile signal, comprising a body having a compartment and electrical contacts, a signal arm pivoted on said body, an electric lamp mounted on said arm, electrical contacts mounted on said arm and forming the terminals of said lamp and adapted to engage with said contacts on said body, said compartment being adapted to receive a battery the terminals of which are adapted to engage with the terminals mounted on said body, and an electrical coupling mounted on the body and adapted to connect a storage battery with said body contacts.

3. In an automobile signal, comprising a body having a compartment and electrical contacts, a signal arm provided on said body, an electric lamp mounted on said arm, electrical contacts mounted on said arm and forming the terminals of said lamp and adapted to engage with said contacts on said body, said compartment being adapted to receive a battery the terminals of which are adapted to engage with the terminals mounted on said body and an electrical coupling mounted on the body and adapted to connect a storage battery with said body contacts, said coupling comprising two complementary sections which are adapted to interlock in two positions in one of which the storage battery is connected with the body contacts and in the other the storage battery is cut off from said body contacts.

EDWARD J. GENSLER.